April 26, 1932. G. J. BREGMAN 1,855,663
ROTARY CUTTING DEVICE
Filed Jan. 9, 1931
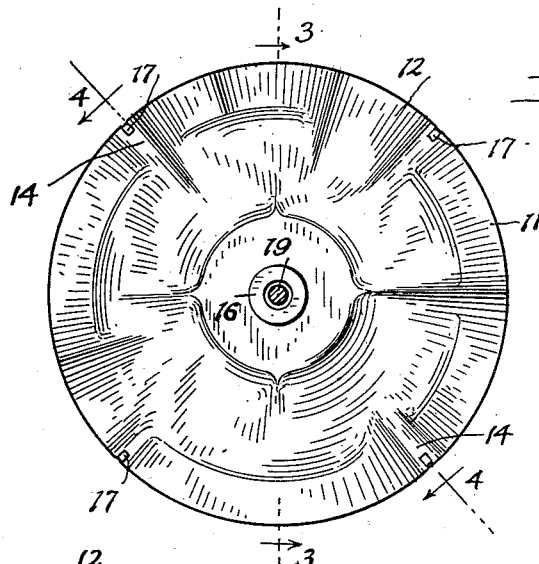
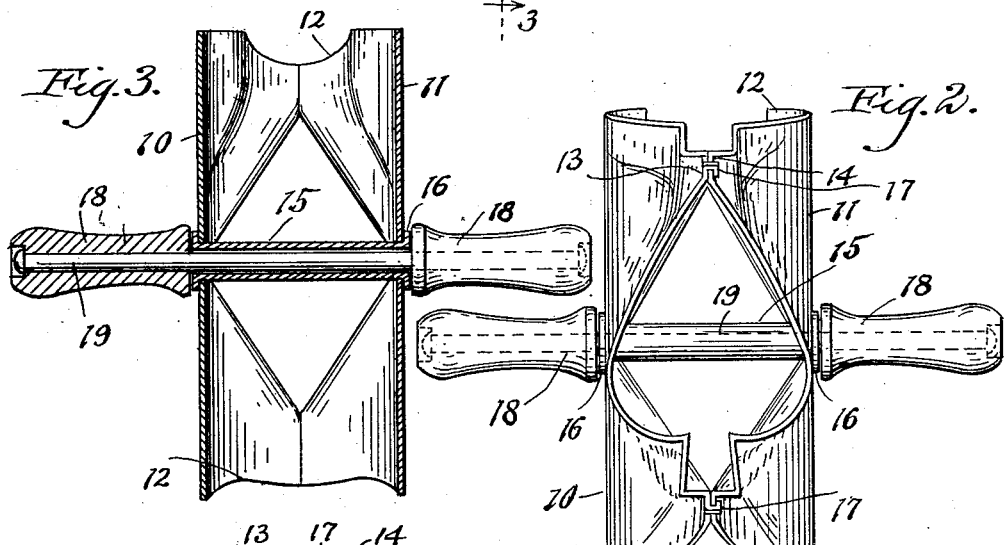
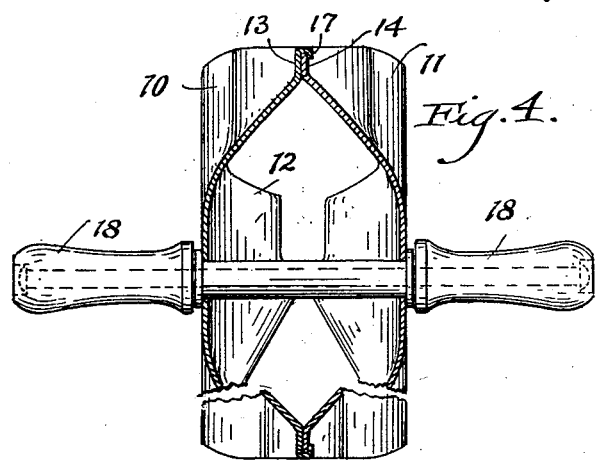
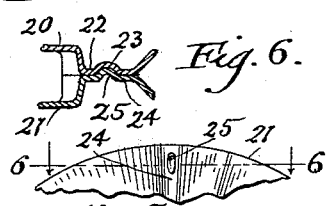
Inventor
George J. Bregman
Kwis Hudson & Kent
attys.

Patented Apr. 26, 1932

1,855,663

UNITED STATES PATENT OFFICE

GEORGE J. BREGMAN, OF CLEVELAND, OHIO

ROTARY CUTTING DEVICE

Application filed January 9, 1931. Serial No. 507,632.

This invention relates to rotary dough cutting devices and as its principal object aims to provide an improved and simplified device of this kind.

Another object of this invention is to provide a rotary dough cutting device in which complementary disk members having deflected portions are held together so that the deflected portions form character-outline cutting means.

A further object of this invention is to provide an improved device of the kind mentioned in which concave disk members stamped from sheet metal and held face to face in assembled relation have complementary deflected edge portions which form a character-outline.

The invention may be further briefly summarized as consisting in certain novel combinations and arrangement of parts hereinafter described and particularly set out in the appended claims.

In the accompanying sheet of drawings,

Figure 1 is a side elevational view of a rotary cutting device constructed according to my invention;

Fig. 2 is an edge view thereof;

Fig. 3 is a sectional elevation taken on the line 3—3 of Fig. 1;

Fig. 4 is a sectional elevation taken on the line 4—4 of Fig. 1;

Fig. 5 is a partial side elevational view of another rotary cutting device constructed according to my invention; and Fig. 6 is a sectional view taken on the line 6—6 of Fig. 5.

In the drawings to which detailed reference will presently be made, I have shown, as the preferred embodiment of my invention, a rotary dough cutting device which, in comparison with devices of this kind heretofore proposed, is extremely simple in form, but before proceeding with a detailed description thereof it should be understood that the principle of my invention may be applied to the construction of various devices of this kind.

My rotary dough cutter, as illustrated in Figs. 1 to 4 of the drawings, comprises a pair of disk members 10 and 11 which are so shaped that when assembled together their peripheral edges constitute a means for cutting a series of variously shaped cookies, biscuits or the like from a sheet or strip of prepared dough. These disk members are made from blanks of suitable sheet material, such as sheet metal, preferably by a stamping operation performed upon the blanks by suitable dies.

As shown in the drawings, when ready for assembly these disk members are substantially circular in form so that the device can be rolled smoothly and rapidly over a mixing board or other platen having a sheet or strip of dough spread thereon. To form the character-outline cutting means, edge portions of each blank are drawn or deflected laterally out of the plane of the blank during the stamping operation, so that each disk member has the general appearance of being somewhat dished or concave with its edge portions, as indicated at 12, fluted or deflected to represent complemental parts of the outlines of desired characters, such as the playing card characters illustrated in Figs. 2 and 3. These deflected portions forming complemental parts of character-outlines, may be provided in any desired number according to the number of characters desired, and are arranged to form a series extending circumferentially around the edge of each disk member. The corresponding deflected portions of the disk members 10 and 11 are alike in all respects except that they are right and left hand, so that when the disk members are arranged face to face, as illustrated in Figs. 2 and 3, complemental deflected edge portions of these members will form a series of complete character-outlines.

To separate the adjacent characters of the series from each other, I form the disk member 10 with relatively narrow contact portions or areas 13 between adjacent character parts, and likewise I form the disk member 11 with similar contact portions 14 between the adjacent character parts of that disk member. When the disk members are assembled face to face, only the contact portions of these members engage each other thus forming a separating means for the adjacent characters, and a means for holding the disk members in proper relation to each other.

For securing the disk members together with the contact portions 13 and 14 in engagement with each other, I provide the hollow connecting member 15 which extends through the disk members substantially centrally thereof. At its ends this connecting member is provided with flange portions 16 which engage the outer faces of the disk members and hold the latter against separation.

In addition to the central securing means for retaining the disk members in properly assembled relation, they may be soldered, welded, or riveted together at the points where the contact areas 13 and 14 engage each other, but as such an additional securing means I prefer to provide the disk member 10 with tangs 17 extending radially outwardly from the contact areas 13, and which at assembly of the disk members, are bent or clamped over the edge of the disk member 11. If desired, the disk member 11 may be provided with shallow notches so that when these tangs are bent over they will fill the notches and be substantially flush with the edge of this disk member. The additional securing means, of whatever form, which is provided at the contact areas of the disk members, prevents rotation of one disk member relative to the other, prevents distortion or separation of these members during use of the cutter, and in addition materially strengthens and reinforces the device.

As a convenient means for manipulating my cutting device, I have provided the same with handle members 18 on opposite sides thereof. These handle members are rotatably mounted upon a spindle or shaft 19 which extends loosely through the hollow connecting member 15. In using my rotary cutter an operator grips the handle members and rolls the device over the sheet or strip of dough from which the desired characters are to be cut.

Instead of riveting, soldering or welding the contact areas of the disk members together, or instead of using tangs as an additional securing means and for preventing relative rotation between the disk members, it may be desirable to construct the device, as shown in Figs. 5 and 6, with disk members 20 and 21 which are of substantially the form already described, but which are provided with inter-engaging lug means at the spaced contact points for preventing relative movement between the disk members. In this construction each of the contact areas 22 of the disk member 20 is provided with a shallow recess 23 and each of the contact areas 24 of the disk member 21 is provided with a correspondingly shaped lug 25. When the disk members are assembled face to face the lugs engage in the recesses, and the central securing member or bushing holding the disk members together, retains the lugs in the recesses so that one disk member cannot be rotated relative to the other.

It should be noted that in my rotary cutter the deflected edge portions of the disk members which form the character-outline cutting means, are all radial with respect to the axis of rotation of the device so that the minimum resistance is offered to their cutting through the dough and, likewise, the tendency for the dough to stick in the device is reduced to a minimum. Furthermore, it will be noted that with the disk members constructed and assembled as described, it is possible to eject dough which may stick in the character cutting openings by simply inserting a finger through the adjacent opening and pushing the dough outwardly from the interior of the device.

It will now be readily understood that I have provided an extremely simple form of rotary dough cutter in which the deflected edge portions of complemental disk members form character-outline cutting means. These disk members can be easily and cheaply made in the form of sheet metal stampings with the result that these simple and efficient cutting devices can be manufactured with great uniformity and can be offered for sale at a low price.

In disclosing my invention I have referred particularly to a rotary cutter comprising two disk members formed as sheet metal stampings, and I regard this as being the preferred construction but, if desired, the device may be made by assembling disk members formed as separate castings, or the device may be made with the disk members or portions constituting a single integral casting.

While I have illustrated and described the device of my invention in a detailed manner, it should be understood, however, that I do not intend to limit myself to the precise details illustrated and described, but regard my invention as including such changes and modifications as do not involve a departure from the spirit of the invention and the scope of the appended claims.

Having thus described my invention, what I claim is:

1. A rotary cutting device comprising substantially circular concave sheet metal stampings held face to face with a concavity therebetween and having complementary deflected edge portions thereof in cooperating relation forming a character-outline.

2. A rotary cutting device comprising disk members having complementary deflected portions, and means retaining said members in definite relation whereby said complementary portions cooperate to form character-outline cutting means.

3. A rotary cutting device comprising a disk member having angularly disposed edge portions, a second disk member having angularly disposed edge portions complemental to the angularly disposed edge portions of the first mentioned member, and means securing said disk members in face to face relation whereby the complemental angularly disposed edge portions of said members cooperate to form a character outline.

4. A rotary cutting device comprising concave disk members arranged with their concave surfaces in face to face relation, said disk members being secured together at points around their perimeters and having portions thereof deflected intermediate said points to form desired characters.

5. A rotary cutting device comprising complementary disk members in contact with each other at spaced points around their perimeters and deflected intermediate the contact points to form character-outline cutting means, and means for holding said disk members together including interengaging means at said contact points.

6. A rotary cutting device comprising a substantially circular concave member having circumferentially spaced deflected portions, another substantially circular concave member having similarly spaced portions which are similarly but oppositely deflected with respect to the deflected portions of the first mentioned member, and means retaining said members in assembled relation with their concave surfaces in face to face relation whereby said deflected portions form character-outline cutting means.

7. A rotary device of the character described comprising a pair of concave disk members arranged in face to face relation with their concavities in communicating relation, said disk members being in contact with each other at spaced points around their perimeters and having portions thereof deflected intermediate the contact points to form character-outline cutting means, and connecting means extending between said disk members substantially centrally thereof.

8. A rotary device of the character described comprising disk members in contact with each other at spaced points around their perimeters and having portions thereof deflected intermediate the contact points to form character-outline cutting means, and handle means having operative engagement with said disk members substantially centrally thereof.

9. A rotary device of the character described comprising disk members in contact with each other at spaced points around their perimeters and having portions thereof deflected intermediate the contact points to form character-outline cutting means, hollow connecting means extending between said disk members substantially centrally thereof, and handle means extending through said hollow connecting means.

In testimony whereof, I hereunto affix my signature.

GEORGE J. BREGMAN.